United States Patent [19]

Langbauer

[11] 4,381,070
[45] Apr. 26, 1983

[54] DEVICE FOR SECURING SURFBOARDS OR THE LIKE ON THE ROOF CARRIERS OF AUTOMOTIVE VEHICLES

[75] Inventor: Josef Langbauer, Grabenstätt, Fed. Rep. of Germany

[73] Assignee: Heinrich Wunder GmbH & Co. KG, Dachau, Fed. Rep. of Germany

[21] Appl. No.: 188,926

[22] Filed: Sep. 19, 1980

[30] Foreign Application Priority Data

Sep. 19, 1979 [DE] Fed. Rep. of Germany ....... 2937850
Nov. 10, 1979 [DE] Fed. Rep. of Germany ....... 2945479

[51] Int. Cl.³ .............................................. B60R 9/08
[52] U.S. Cl. .................................... 224/321; 224/330; 224/331
[58] Field of Search ............... 224/309, 319, 321, 322, 224/323, 324, 42.24, 42.37, 917, 330, 331

[56] References Cited

U.S. PATENT DOCUMENTS

| | | | |
|---|---|---|---|
| 4,111,344 | 9/1978 | MacDonald | 224/42.24 |
| 4,217,999 | 8/1980 | Forsman | 224/319 |
| 4,289,260 | 9/1981 | Zoor | 224/321 X |

FOREIGN PATENT DOCUMENTS 22221 1/1981 European Pat. Off. ............ 224/315

*Primary Examiner*—Steven M. Pollard
*Attorney, Agent, or Firm*—Kontler, Grimes & Battersby

[57] ABSTRACT

The device for securing the hull of a watercraft and/or a sailboat mast comprises a locking bar the lower end of which has a hook, an annular eyelet or a crosshead by means of which the locking arm can be secured on a portion of the roof carrier which supports the hull of the watercraft and is secured to the roof of an automotive vehicle or on the sailboat mast which can be inserted between the roof and the roof carrier during transport. The upper end of the locking bar has a thread onto which can be screwed a flange or nut by means of which the hull of the watercraft or the sailboat mast can be securely clamped. The threadedly connectable flange or nut acts either upon the hull of the watercraft, e.g., a surfboard, or upon a portion of the roof carrier when the sailboat mast is secured by the locking bar. If this safety device is to be used in connection with the hull of a watercraft, it is necessary that the hull be provided with a through opening, for example, a daggerboard opening.

17 Claims, 13 Drawing Figures

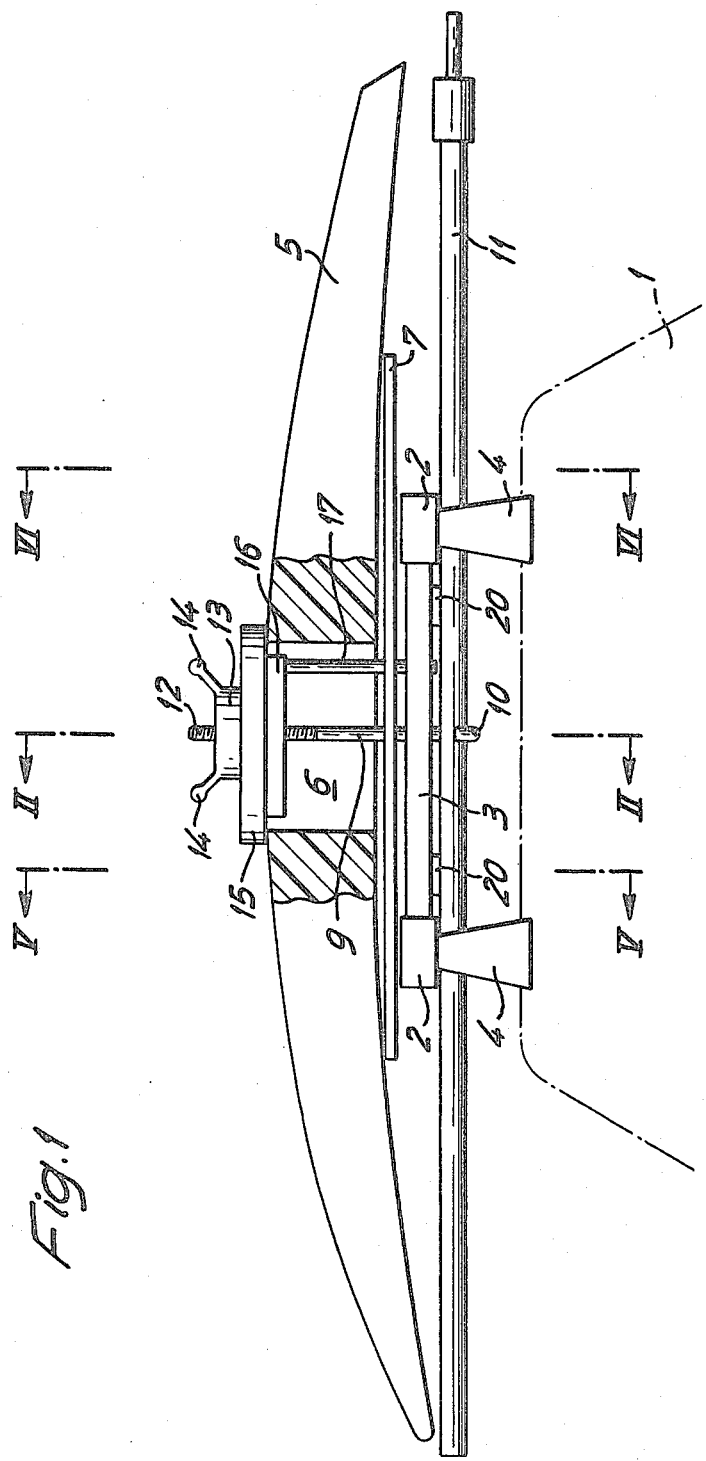

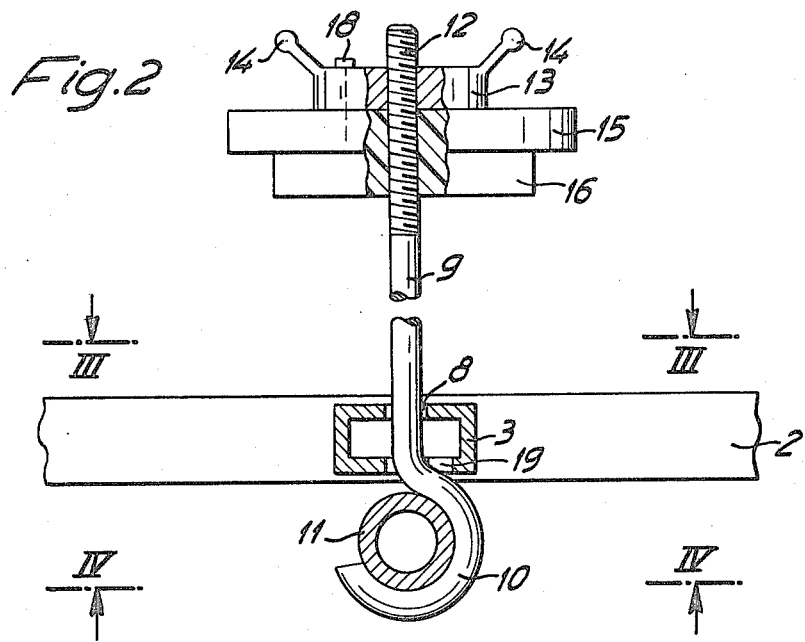
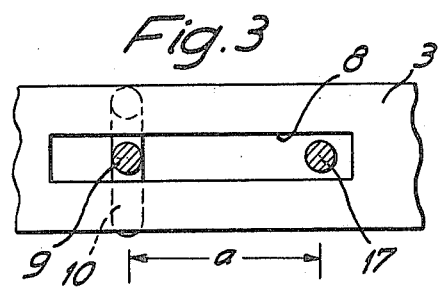
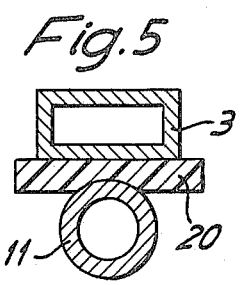
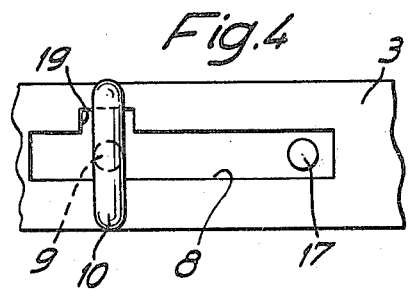
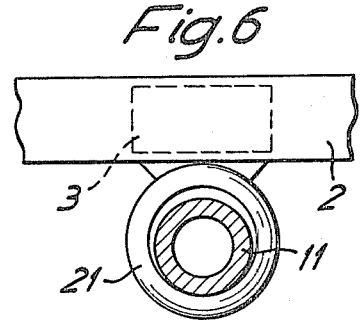

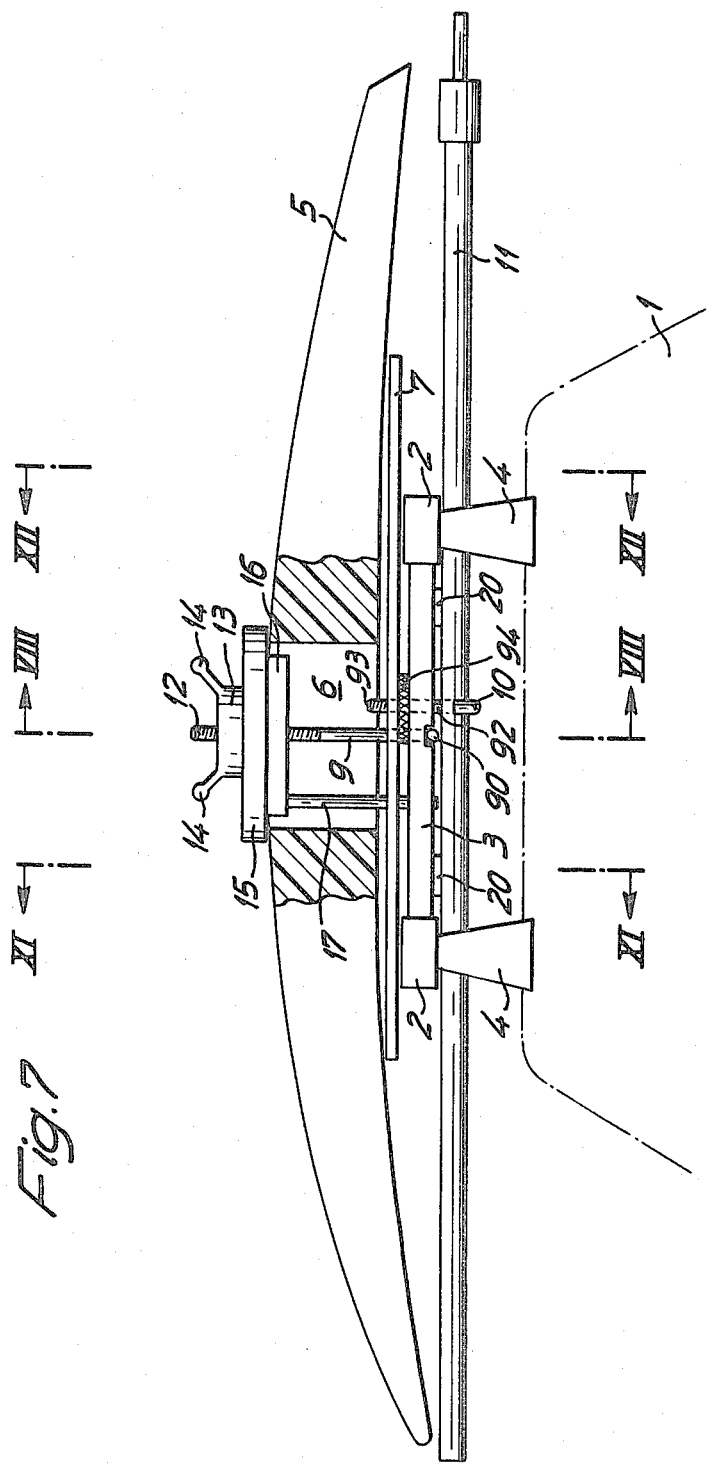

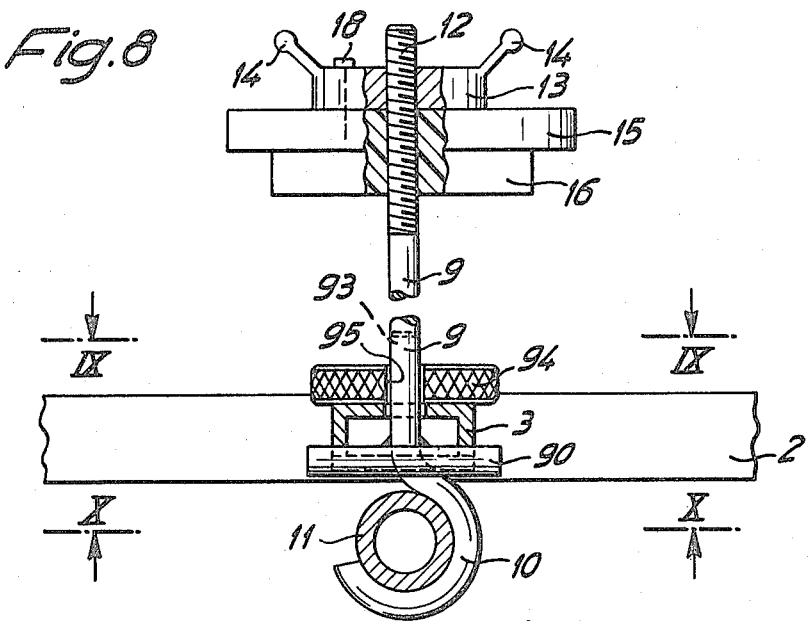
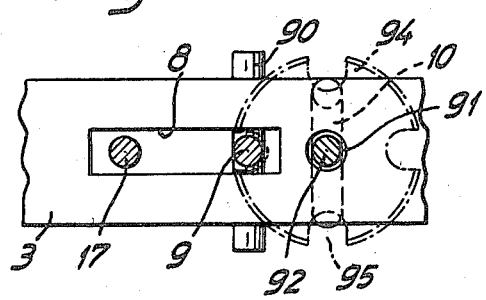
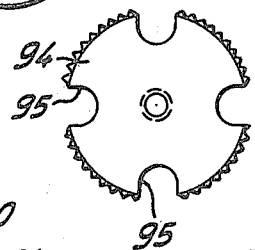
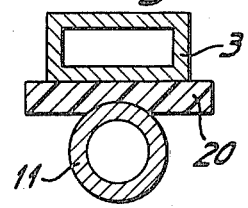
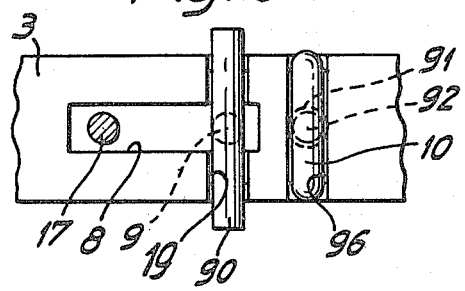
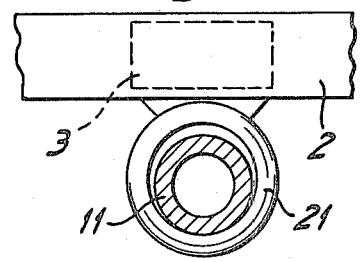

DEVICE FOR SECURING SURFBOARDS OR THE LIKE ON THE ROOF CARRIERS OF AUTOMOTIVE VEHICLES

BACKGROUND OF THE INVENTION

The invention relates to a device for securing the hull of a watercraft with an opening, especially a surfboard and/or a sailboat mast, on a roof carrier which is to be installed on the roof of an automotive vehicle. More specifically, the invention relates to a device which is provided with a locking bar extending through the opening, the lower end of which is adapted to be fixed relative to the roof carrier and the upper end of which is provided with a flange intended to be placed against the body of the boat.

In a known device for securing a hull of the watercraft, especially a surfboard, a locking bar which can extend through the opening of the hull of the watercraft can be introduced into a hollow carrier arm of the roof carrier to be securable therein by means of a lockable safety bolt. The flange which is provided on this locking bar and which prevents unauthorized removal of the hull of the watercraft is provided solely to secure against theft but not as a safety device during transport of the hull of the watercraft which hull must be fixedly held on the roof carrier by additional belts. Furthermore, such safety device can be used only in connection with a specially designed roof carrier which comprises a safety bolt in a hollow carrier arm in order to secure the lower end of the locking bar against unauthorized removal.

OBJECTS AND SUMMARY OF THE INVENTION

An object of the invention is to construct a device of the above explained type in such a way that it can serve not only as a means for securing against theft but also as a means for securing during transport and that, in addition, the device can be applied to practically all roof carriers without it being necessary to design the roof carrier in a special way.

This object is accomplished by utilizing a locking bar the lower end of which comprises a hook or a ring-shaped eyelet so it can be fixed to any carrier arms or braces of the roof carrier whereupon the hull of the watercraft can be urged against the roof carrier with assistance from the threadable flange so that additional securing means can be dispensed with. Since the flange can be lockingly arrested against rotation, it cannot be disengaged in an unauthorized manner so that the safety device not only secures during transport but also constitutes a safety device against theft.

It is possible to secure only the hull of the watercraft or the appurtenant sailboat mast alone on the roof carrier, or to secure both such parts by a single common locking bar not only to each other but also on the roof carrier. In order to secure the hull of the watercraft alone, the hook or the ring-shaped eyelet of the locking bar is fixed on a portion of the roof carrier subsequent to its introduction through the opening of the hull of the watercraft, whereupon the flange is brought into mesh with the thread at the upper end of the locking bar and is locked thereon against unauthorized disengagement. In order to secure the sailboat mast alone on the roof carrier, the sailboat mast is introduced between the roof and the roof carrier and is thereupon tensioned against the roof carrier from below by the locking bar by way of the threaded flange. The sailboat mast can be held by the hook at the lower end of the locking bar or by the ring-shaped eyelet through which it is caused to pass during introduction between the roof and the roof carrier. Owing to tensioning of the sailboat mast against the roof carrier by way of the locking bar and the threadable and lockable flange, the resulting friction at the contact points of the mast renders it possible to remove the latter only after destruction thereof. However, it is also possible, with assistance from the novel device, to simultaneously secure the hull of the watercraft and the sailboat mast on the roof carrier. In such instance, the hook or the ring-shaped eyelet does not engage the roof carrier but rather the sailboat mast so that the sailboat mast and the hull of the watercraft are clamped against each other. The sailboat mast is then located below the roof carrier, i.e., between the roof and the roof carrier of the automotive vehicle, and the hull of the watercraft is located on the roof carrier. The hook or the ring-shaped eyelet can lie against a portion of the roof carrier after a certain preliminary tensioning of the sailboat mast in order to prevent excessive tensioning of the sailboat mast.

An especially advantageous application of the novel device can be achieved with a roof carrier having a connecting arm which extends in the direction of longitudinal axis of the vehicle and is provided with an opening which passes entirely therethrough and serves for the passage of the locking bar. In this manner, there is provided not only an abutment for the hook or the ring-shaped eyelet, in the event that the hull of the watercraft is to be tensioned alone or in combination with the sailboat mast, but also an abutment for the threadable flange in the event that the sailboat mast alone is tensioned against the roof carrier from below. Furthermore, the opening in the connecting arm ensures that any shifting of the object to be secured is limited to the length of this opening, as considered in the longitudinal direction, in the event that the object to be secured can be shifted lengthwise owing to insufficient tensioning by means of the flange.

In accordance with a further development, one can achieve an especially satisfactory conformance to different configurations of the underside of the hull of the watercraft. Furthermore, one avoids damage and dents which develop as a result of pressure if the tensioning washer consists of a relatively soft and yieldable material, preferably a synthetic plastic substance.

Owing to a further development in accordance with the invention, one can achieve that the hull of the watercraft can be held with absolute certainty in parallelism with the direction of travel, i.e., that one avoids, even when travelling at a high speed and under any and all circumstances, a certain pivoting of the longitudinal axis of the hull of the watercraft with respect to the direction of travel and the longitudinal axis of the vehicle.

Owing to a further development in accordance with the invention, one achieves an especially advantageous rotation-free locking between the locking bar and the flange.

Owing to a further development, one achieves that the plane of the hook or of the ring-shaped eyelet of the locking bar is retained in a position extending transversely of the direction of travel and that such position is maintained even in the event of pronounced tensioning of the threaded flange. This, too, prevents eventual pressure-induced dents or damage to the sailboat mast.

Owing to a further development, one not only achieves a rattle-free mounting of the sailboat mast at the underside of the connecting arm but, furthermore, one also achieves such secure frictional engagement between the sailboat mast and the connecting arm that unauthorized extraction of the sailboat mast from the roof carrier is not possible even if the flange of the locking bar is not overly tight.

A further development facilitates the "threading in" of the sailboat mast into the hook or the ring-shaped eyelet of the locking bar.

The constructions according to a further development of the invention take into consideration the fact that the hook of the locking bar cooperates either with the sailboat mast or with a part of the roof carrier.

The independent securing of the sailboat mast during transport and against theft is possible if the retention against rotation is independent of securing of the hull of the watercraft. For example, a lock with a slidable bolt can be provided on the roof carrier in imitation of a lock for the spokes of a bicycle, the slidable bolt being insertable into the recess of the disc-shaped nut to secure the latter.

Such an additional lock is not necessary in a further embodiment of the invention; however, in such modification the sailboat mast is not secured any more upon removal of the hull of the watercraft, and hence of the locking bar for the hull of the watercraft.

BRIEF DESCRIPTION OF THE DRAWING

FIG. 1 is an elevational view of a first embodiment of a securing device in accordance with the invention in operative position on a roof carrier with a watercraft hull which is partly broken away;

FIG. 2 is a section along the line II—II in FIG. 1 in an enlarged fragmentary view;

FIGS. 3 and 4 are sections along the lines III—III and IV—IV in FIG. 2;

FIGS. 5 and 6 are sections along the lines V—V and VI—VI in FIG. 1, each in an enlarged view;

FIG. 7 is a view, corresponding to that of FIG. 1, of a second embodiment of a safety device according to the invention;

FIG. 8 is a section along the lines VIII—VIII in FIG. 7 in an enlarged fragmentary view;

FIGS. 9 and 10 are sections along the lines IX—IX and X—X in FIG. 8;

FIGS. 11 and 12 are sections along the lines XI—XI and XII—XII in FIG. 7; each in an enlarged view, and FIG. 13 is a plan view of a disc-shaped nut which forms part of the safety device.

A roof carrier which is provided on the roof of a schematically indicated automotive vehicle 1 comprises two spaced apart supporting arms 2 extending in parallelism with the transverse axis of the vehicle at a level above the roof, and a connecting arm 3 which extends between the supporting arms 2 in parallelism with the longitudinal axis of the vehicle. The supporting arms 2 are secured to a gutter of the vehicle roof by pairs of clamping claws 4 in customary fashion. In order to transport a surfboard 5 (i.e., a component of a watercraft) with a daggerboard opening 6, a customary wishbone boom 7 is placed onto the supporting arms 2 in the longitudinal direction of the vehicle and the surfboard 5 is placed onto the boom with its underside facing upwardly. Such mode of transporting resp. mounting on the roof carrier corresponds to the state of art.

The median portion of the connecting arm 3 has a vertical through opening or aperture in the form of a longitudinally extending slot 8 in order to be capable of guiding downwardly through the connecting arm 3 a locking bar 9 the lower end of which comprises a hook 10. The inner cross section of the hook 10 exceeds the cross section of a sailboat mast 11 which is to be mounted on the roof carrier in addition to the surfboard 5.

Therefore, the length of the slot 8 invariably exceeds the outer diameter of the hook 10.

The upper end of the locking bar 9 has a thread 12 which can mesh with a threaded member or flange 13 provided with tensioning handgrip devices 14. The underside of a tensioning washer 15 which is disposed between the threaded flange 13 of the locking bar and the surfboard 5 has a rectangular projection 16 which, in turn, is intended to enter the daggerboard opening 6 of the surfboard 5. In contrast to the flange 13, the tensioning washer 15 and its projection 16 are freely movable in the axial direction of the locking bar 9.

An eccentric axially parallel rotation preventing pin 17 (compare FIGS. 1, 3 and 4) is provided at the underside of the tensioning washer 15 resp. projection 16. The pin 17 is intended to be received in the slot 8 of the connecting arm 3 in addition to the locking bar 9. Thus, the length of the slot 8 corresponds at least to one-half of the outer diameter of the hook 10 plus the eccentricity a of the rotation preventing pin 17 relative to the locking bar 9.

A rotation preventing connection between the locking bar 9 and its flange 13 can be established by a lock 18 which operates between the flange 13 and the tensioning washer 15. The separable engagement between the lock 18 and the tensioning washer 15 is indicated in FIG. 2 by a short broken line.

As best shown in FIG. 4, the underside of the slot 8 in the connecting arm 3 is provided with at least one slot section 19 which is normal thereto and serves for form-locking reception of the upper shoulder of the hook 10 in tensioned condition of the locking bar 9.

Elastic seats 20 for the sailboat mast 11 are provided at the underside of the connecting arm 3 ahead of an behind the slot 8, as considered in the direction of travel. The seats have partly cylindrical recesses in order to establish larger frictional contact surfaces with the periphery of the sailboat mast 11.

A guide 21 for insertion of the sailboat mast 11 (compare FIG. 6) is provided at the rear end portion of the underside of the connecting arm 3 and is axially parallel therewith.

In order to mount the surfboard 5 and the sailboat mast 11 for safe transport and in a theftproof manner, the wishbone boom 7 is placed first onto the supporting arms 2 and the surfboard 5 is placed onto the boom as shown in FIG. 1. In the next step, the locking bar 9 which carries the tensioning washer 15 and whose end portion 12 meshes with the threaded flange 13 is introduced from above into the daggerboard opening 6 whereby the plane of the hook 10 extends in substantial parallelism with the direction of travel. It is then possible to push the locking bar, if necessary together with the rotation preventing pin 17 of the tensioning washer 15, from above through the slot 8 of the connecting arm 3 and in a downward direction until the hook 10 extends downwardly and beyond the underside of the connecting arm 3. In such position, the locking bar 9 is turned through 90° so that the plane of the hook 10 then extends at right angles to the direction of travel resp. to the longitudinal axis of the vehicle. In the next step, the sailboat mast 11 is introduced into the guide 21 from the rear side of the vehicle resp. surfboard and is continuously pushed forwardly in parallelism with the axis of the connecting arm 3 until it reaches the position shown in FIG. 1 whereby the sailboat mast automatically engages the hood 10. Already during introduction of the locking bar 9 into the slot 8 or possibly thereafter when the sailboat mast 11 already assumes the position shown in FIG. 1, the tensioning washer 15 is moved downwardly so that the rotation preventing pin 17, too, fully enters the slot 8. In the next step, the flange 13 is tightened by way of the handgrip devices 14 until the surfboard 5 is biased against the supporting arms 2 from above and the sailboat mast 11 is biased from below against the supporting arms 2 resp. against the seats 20 of the connecting arm 3. In this position, the lock 18 is actuated in such a way that a locking action takes place between the flange 13 and the tensioning washer 15.

Since the daggerboard opening 6 of the surfboard 5 is formlockingly engaged by the projection 16 and hence with the tensioning washer 15 and, on the other hand, the tensioning washer 15, when in the position of FIG. 1, is held against rotation because the rotation preventing pin 17 extends into the slot 8, one achieves an absolutely secure retention of the longitudinal axis of the surfboard 5 in parallelism with the longitudinal axis of the vehicle. Not only the surfboard 5 but also the sailboat mast 11 is protected in theftproof manner and neither can be removed from the roof carrier by unauthorized persons.

To the extent that identical parts are involved, the reference characters used in the embodiment of FIGS. 7 to 13 are the same as those in the embodiment of FIGS. 1 to 6.

As can be seen in FIG. 7, when viewed together with FIGS. 9 and 10, separate safety devices are provided for the surfboard 5 and the sailboat mast 11. The surfboard 5 is secured by a locking bar 9 on the lower end of which has a T-shaped crosshead 90 which can be introduced through the slot 8 of the connecting arm 3 in the same was as the hook 10 in the embodiment of FIGS. 1 to 6. After the locking bar 9 with its crosshead or hook 90 is caused to pass through the slot 8, the locking bar is turned through 90° so that the crosshead or hook 90 can engage the connecting arm 3 from below when the flange 13 is drawn tight in order to secure the surfboard 5 on the roof carrier. The locking bar 9, which extends through the daggerboard opening 6, can be secured with a lock 18 which cooperates with the flange 13 in the same way as in the embodiment of FIGS. 1 to 4.

As can be best seen in FIG. 10, the underside of the connecting arm 3 has a slot section 19 which extends at right angles to the slot 8 and serves for formlocking reception of the crosshead 90.

In order to secure the sailboat mast 11, there is provided a further locking bar 92 the lower end of which comprises a hook 10 having an inner cross section which exceeds the cross section of the sailboat mast 11. The upper end of the locking bar 92 is provided with a threaded portion 93 which can mesh with a knurled disc-shaped nut 94 having four uniformly distributed recesses or sockets 95 as considered in the circumferential direction. In order to allow for the application of the locking bar 92, the connecting arm 3 is provided with an opening 91. The underside of the connecting arm 3 has a slot section 96 which is disposed in the region of the opening 91 and serves for formlocking reception of the upper shoulder of the hook 10 of the locking bar 92 in order to prevent turning of the locking bar 92 during tensioning of the disc-shaped nut 94. Since the shoulder of the hook 10 lies against the connecting arm 3, it is not possible to subject the sailboat mast 11 to excessive clamping stresses.

In the same way as in the embodiment of FIGS. 1 to 6, elastic seats 20 for the sailboat mass 11 are provided at the underside of the connecting arm 3. The mast can be biased against the seats by the locking bar 92.

In order to securely mount the surfboard 5 as well as the sailboat mast 11 and the wishbone boom 7 for transport as well as against theft, the wishbone boom 7 is placed first onto the supporting arms 2 and the surfboard 5 is placed onto the boom in a manner as already described in connection with the embodiment of FIGS. 1 to 6. In the next step, the locking bar 92 is introduced into the opening 91 from below so that the plane of the hook 10 extends substantially at right angles to the direction of travel. The sailboat mast is introduced through the guide 21 in parallelism with the connecting arm 3 and through the hook 10 until it reaches the position which is shown in FIG. 7. The disc-shaped nut 94 is thereupon screwed onto the thread 93 and is tensioned in such a way that the sailboat mast 11 is strongly biased against the seats 20. In its final position, the disc-shaped nut is oriented in such a way that one of the recesses 95 is moved into register with the slot 8.

Upon completion of such procedure, the locking bar 9 is introduced into the daggerboard opening 6 from above and is caused to pass through the slot 8 and, after turning through 90°, the crosshead 90 is formlockingly introduced into the slot section 19. In such position, the locking bar 9 is in formlocking engagement with one of the recesses 95 on the disc-shaped nut 94 so that the locking device for the mast is secured against unauthorized opening when the flange 13 is locked by the lock 18 so that the locking bar 9 cannot be removed.

The embodiments show that it is possible, with assistance from the locking bar and a threaded flange or nut, to secure a surfboard together with a sailboat mast as shown in FIG. 1 or to secure the surfboard and the sailboat mast independently of each other by two locking bars as can be seen in FIG. 7. It can further be seen that securing of the surfboard or of the mast does not invariably necessitate the provision of a connecting arm which extends in the longitudinal direction of the automotive vehicle but rather that the lower end of the locking bar can be located on the transversely extending supporting arms 2 whereby such lower end preferably constitutes a hook so that it can engage with the transversely extending arm. As concerns the basic concept of the invention, the exact shape of the hook is immaterial as long as one ensures that the lower end of the locking bar can be secured on a portion of the roof carrier or mast in order to allow for clamping of the object to be transported by way of the threadedly connectable flange.

I claim:

1. A device for securing at least one component of a watercraft, such as a surfboard, which has an opening, on the roof of an automotive vehicle, comprising a roof carrier on the roof of the vehicle, said roof carrier including an arm having an aperture; a locking bar having an externally threaded upper portion and a lower portion, said locking bar being arranged to extend through the opening of the component when the latter is placed onto said roof carrier and through the aperture of said arm so that said lower portion of said locking bar is located at a level below said aperture, said locking bar being turnable between a first position in which said lower portion thereof engages with and a second position in which said lower portion thereof can be disengaged from said roof carrier; a threaded member movable into mesh with said upper portion while said locking bar extends through the opening of the component on said roof carrier to urge the component against the roof carrier; a tensioning member disposed between the commodity through which said locking bar extends and said threaded member, said tensioning member having a portion non-rotatably receivable in the opening of the component on said roof carrier and a portion extending into the aperture of said arm to hold said tensioning member against rotation relative to said arm; and means for releasably locking said threaded member in a position in which said threaded member holds said lower portion of said locking bar in engagement with said roof carrier in the first position of said locking bar.

2. The device of claim 1, wherein said tensioning member is movable axially of said locking bar.

3. The device of claim 1, wherein said aperture includes an elongated slot, said locking bar and said portion of said tensioning member being spaced apart from each other, as considered in the longitudinal direction of said slot.

4. The device of claim 1, wherein said locking means includes means for non-rotatably securing said threaded member to said tensioning member.

5. The device of claim 1, wherein said aperture has a section disposed at the underside of said arm and extending transversely of said slot, said lower portion of said locking bar extending into said section of said aperture in said first position of said locking bar.

6. The device of claim 1, wherein the lower portion of said locking bar is T-shaped.

7. The device of claim 1, wherein the lower portion of said locking bar is C-shaped.

8. The device of claim 1, wherein the lower portion of said locking bar is O-shaped.

9. The device of claim 1 for securing to the roof carrier a sailboat mast in addition to the one component, further comprising a second locking bar arranged to extend through the roof carrier and having a lower portion engageable with a portion of a mast while such mast extends between the roof of the vehicle and the roof carrier and an externally threaded upper portion, and a second threaded member meshing with the upper portion of said second locking bar and engaging with the roof carrier to hold the mast against the underside of the roof carrier while said second threaded member bears against the upper side of the roof carrier.

10. The device of claim 9, wherein said second threaded member has at least one socket and further comprising second locking means removably extending into said socket to lock the second threaded member against rotation relative to the second locking bar.

11. The device of claim 10, wherein said second locking means includes a portion of said first mentioned locking bar.

12. The device of claim 9, wherein the roof carrier has an arm with an aperture through which said second locking bar extends so that the upper and lower portions of the second locking bar are respectively located above and below said arm.

13. A device for securing at least one component of a watercraft, such as a surfboard, which has an opening, and a mast in addition to or instead of the one component, on the roof of an automotive vehicle, comprising a roof carrier including an arm having an aperture; a locking bar having an externally threaded upper portion and a lower portion having an eyelet, said locking bar being arranged to extend through the opening of the component when the latter is placed onto said roof carrier and through the aperture of said arm so that said lower portion of said locking bar is located at a level below said aperture, said locking bar being turnable between a first position in which said lower portion thereof engages with and a second position in which said lower portion thereof can be disengaged from said roof carrier; a threaded member movable into mesh with said upper portion while said locking bar extends through the opening of the component on said roof carrier to urge the component against the roof carrier; a tensioning member disposed between the commodity through which said locking bar extends and said threaded member, said tensioning member having a portion non-rotatably receivable in the opening of the component on said roof carrier; and means for releasably locking said threaded member in a position in which said threaded member holds said lower portion of said locking bar in engagement with said roof carrier in the first position of said locking bar, the mast being insertable between the roof of the vehicle and said roof carrier so as to extend through said eyelet whereby the locking bar cannot be extracted from the opening of the component on said roof carrier prior to withdrawal of the mast from said eyelet.

14. The device of claim 13, further comprising at least one elastic seat at the underside of said arm so that a mast which extends through said eyelet abuts against such seat.

15. The device of claim 13, further comprising a guide provided on the roof carrier and defining a passage for a portion of the mast which extends through said eyelet.

16. A device for securing at least one component of a watercraft, such as a surfboard, which has an opening, and a sailboat mast in addition to the one component, on the roof of an automotive vehicle, comprising a roof carrier on the roof of the vehicle, said roof carrier having an arm with an aperture therein; a first locking bar having an externally threaded upper portion and a lower portion, said locking bar being arranged to extend through the opening of the one component when the latter is placed onto said roof carrier and said lower portion of said locking bar being movable into engagement with said roof carrier; a threaded member movable into mesh with said upper portion while said locking bar extends through the opening of the one component of said roof carrier to urge the one component against the roof carrier; means for releasably locking said threaded member in a position in which said threaded member holds said lower portion of said locking bar against disengagement from said roof carrier; a second locking bar arranged to extend through the aperture of said arm and having a lower portion located below said arm and engageable with a portion of a mast while such mast extends between the roof of the vehicle and said roof carrier and an externally threaded upper portion located above said arm; and a nut meshing with the upper portion of said second locking bar and engaging with said roof carrier to hold the mast against the underside of said roof carrier while said second threaded member bears against the upper side of said roof carrier, said nut having a peripheral recess and said first locking bar being arranged to extend through said arm and being sufficiently close to said second locking bar to enter said recess when said first locking bar secures the one component to said roof carrier.

17. A device for securing at least one component of a watercraft, such as a surfboard, which has an opening, and a mast in addition to or instead of said one component, on the roof of an automotive vehicle, comprising a roof carrier including an arm having an aperture; a locking bar having an externally threaded upper portion and a lower portion configured to confine at least a portion of a mast, said locking bar being arranged to extend through the opening of the one component when the latter is placed onto said roof carrier and through the aperture of said arm so that said lower portion of said locking bar is located at a level below said aperture, said locking bar being turnable between a first position in which said lower portion engages with and a second position in which said lower portion can be disengaged from said roof carrier; a threaded member movable into mesh with said upper portion while said locking bar extends through the opening of the one component on said roof carrier to urge the one component against the roof carrier; and means for releasably locking said threaded member in a position in which said threaded member holds said lower portion of said locking bar in engagement with the roof carrier in the second position of said locking bar, the mast being insertable between the roof of the vehicle and said roof carrier to have a portion thereof confined by said lower portion whereby the locking bar cannot be extracted from the opening of the one component on said roof carrier prior to withdrawal of the mast from engagement with the lower portion of said locking bar.

* * * * *